United States Patent
Serrurier et al.

(10) Patent No.: US 12,209,396 B2
(45) Date of Patent: Jan. 28, 2025

(54) RETAINER SLEEVE DESIGN WITH ANTI-ROTATION FEATURES

(71) Applicant: Caterpillar Inc., Peoria, IL (US)

(72) Inventors: Douglas C. Serrurier, Morton, IL (US); Eric T. Sinn, Tremont, IL (US); Jason Grant Jura, Tremont, IL (US); Corey Michael Wells, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 59 days.

(21) Appl. No.: 18/203,920

(22) Filed: May 31, 2023

(65) Prior Publication Data

US 2023/0304268 A1    Sep. 28, 2023

Related U.S. Application Data

(62) Division of application No. 16/929,630, filed on Jul. 15, 2020, now Pat. No. 11,702,820.

(60) Provisional application No. 62/887,745, filed on Aug. 16, 2019.

(51) Int. Cl.
E02F 9/28    (2006.01)

(52) U.S. Cl.
CPC .......... *E02F 9/2833* (2013.01); *E02F 9/2825* (2013.01)

(58) Field of Classification Search
CPC .... A01B 35/225; E02F 9/2841; E02F 9/2833; F16B 21/02
See application file for complete search history.

(56) References Cited

U.S. PATENT DOCUMENTS

| | | | |
|---|---|---|---|
| 7,252,066 B2 | 8/2007 | Hamilton | |
| 7,377,597 B2 | 5/2008 | Morris | |
| 9,222,243 B2 | 12/2015 | Cheyne et al. | |
| 9,315,971 B2 | 4/2016 | LaHood | |
| 10,011,977 B2 | 7/2018 | Guimaraes et al. | |
| 10,030,367 B2 | 7/2018 | Dare | |
| 11,142,894 B2 | 10/2021 | Wells et al. | |
| 11,427,989 B2 | 8/2022 | Serrurier | |
| 11,702,820 B2 * | 7/2023 | Serrurier | E02F 3/40 37/455 |

(Continued)

FOREIGN PATENT DOCUMENTS

| | | |
|---|---|---|
| CN | 107620846 | 1/2018 |
| DE | 4342348 C1 | 4/1995 |

(Continued)

OTHER PUBLICATIONS

Chilean office action for Chile Patent Appln. No. 202200360, mailed Aug. 6, 2024 (16 pgs).

(Continued)

*Primary Examiner* — Gary S Hartmann

(57) ABSTRACT

A retainer sleeve includes an at least partially annular body defining an axis of rotation, a radial direction, and a circumferential direction. The body may also have a radially inner annular surface defining a radially inner aperture, and a first anti-rotation feature extending radially inwardly from the radially inner annular surface including a sloping ledge having a locking surface that faces at least partially in the circumferential direction and along a direction that is parallel to the axis of rotation, forming an oblique angle with the direction that is parallel to the axis of rotation.

19 Claims, 11 Drawing Sheets

(56) References Cited

U.S. PATENT DOCUMENTS

| | | | |
|---|---|---|---|
| 11,761,177 B2 * | 9/2023 | Jura | ............... E02F 9/2833 37/455 |
| 2005/0002753 A1 | 1/2005 | Haas | |
| 2005/0170924 A1 | 8/2005 | Meya | |
| 2006/0186603 A1 | 8/2006 | Berdichevsky | |
| 2008/0036274 A1 | 2/2008 | Hall et al. | |
| 2012/0051836 A1 | 3/2012 | Jakubisin | |
| 2014/0259810 A1 | 9/2014 | LaHood | |
| 2014/0259813 A1 | 9/2014 | Campomanes et al. | |
| 2014/0352180 A1 | 12/2014 | Campomanes | |
| 2016/0040705 A1 | 2/2016 | Peter | |
| 2018/0073543 A1 | 3/2018 | Bjerke et al. | |
| 2019/0003156 A1 | 1/2019 | Dare et al. | |
| 2019/0118880 A1 | 4/2019 | Tutschek | |
| 2019/0185078 A1 | 6/2019 | Hakes | |
| 2022/0259836 A1 | 8/2022 | Jura | |
| 2022/0275609 A1 | 9/2022 | Serrurier | |

FOREIGN PATENT DOCUMENTS

| | | |
|---|---|---|
| DE | 102008052389 | 4/2010 |
| RU | 2452819 | 6/2012 |
| RU | 2546179 | 4/2015 |

OTHER PUBLICATIONS

Chilean office action for Chile Patent Appln. No. 202200360, mailed Nov. 7, 2023 (18 pgs).

* cited by examiner

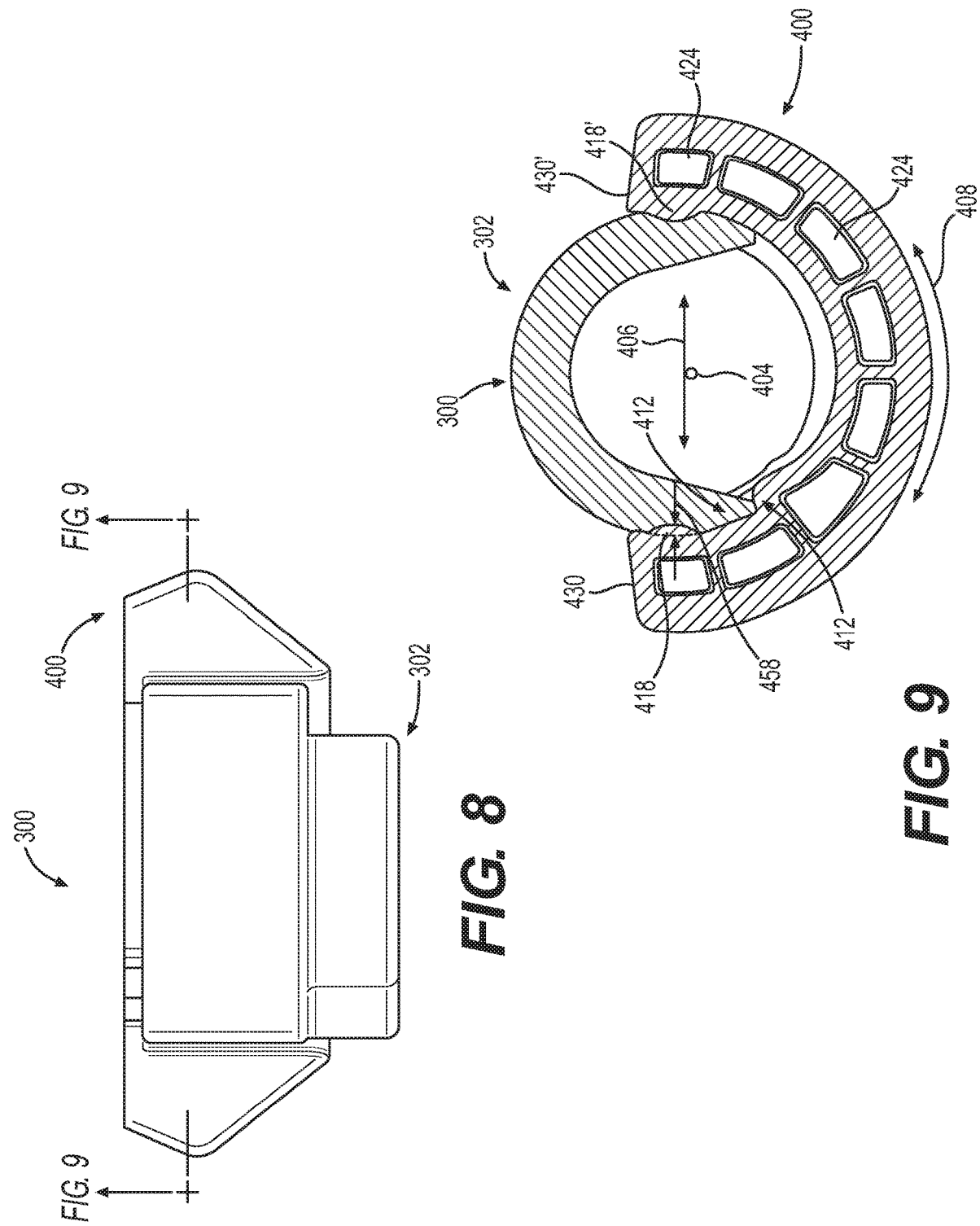

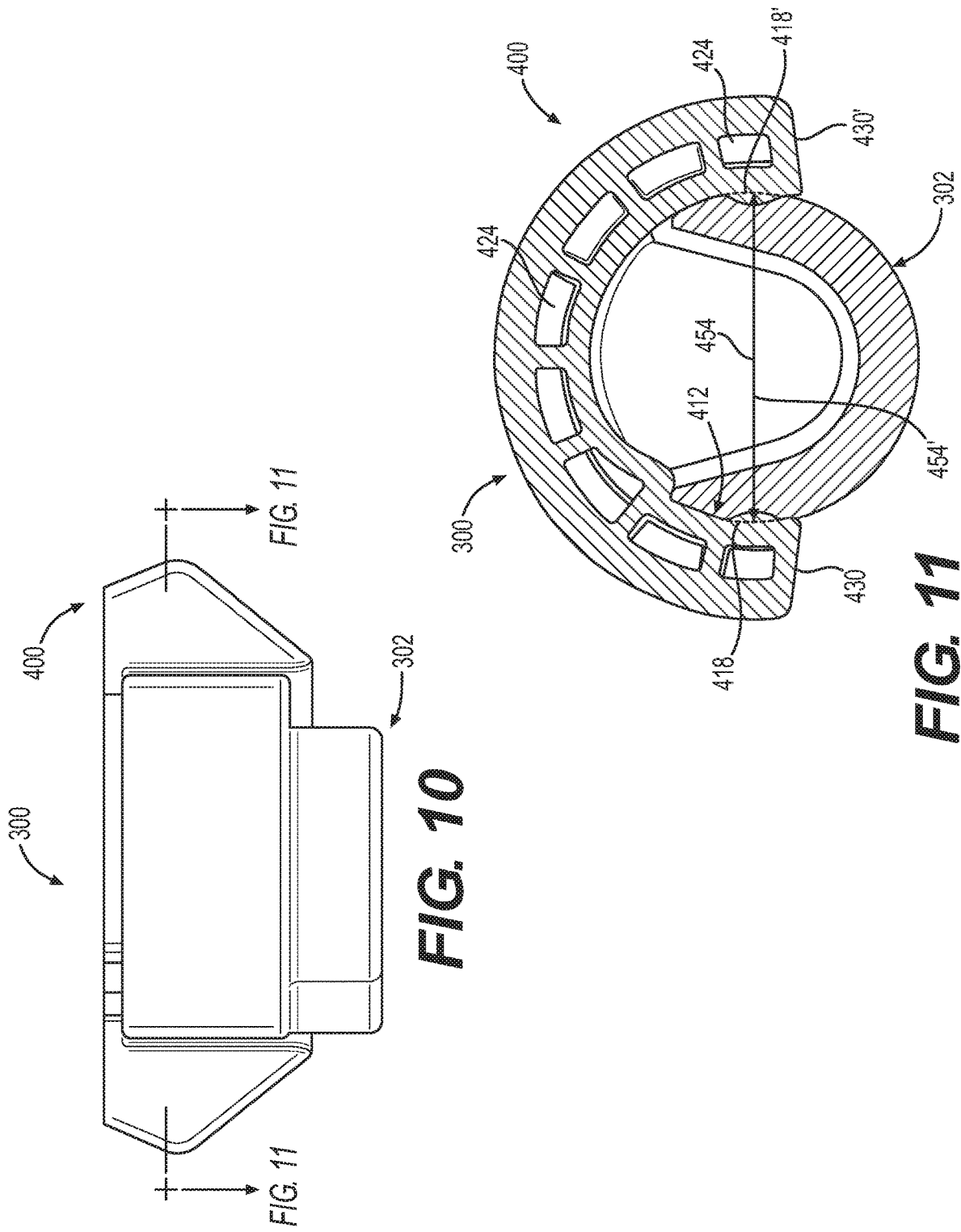

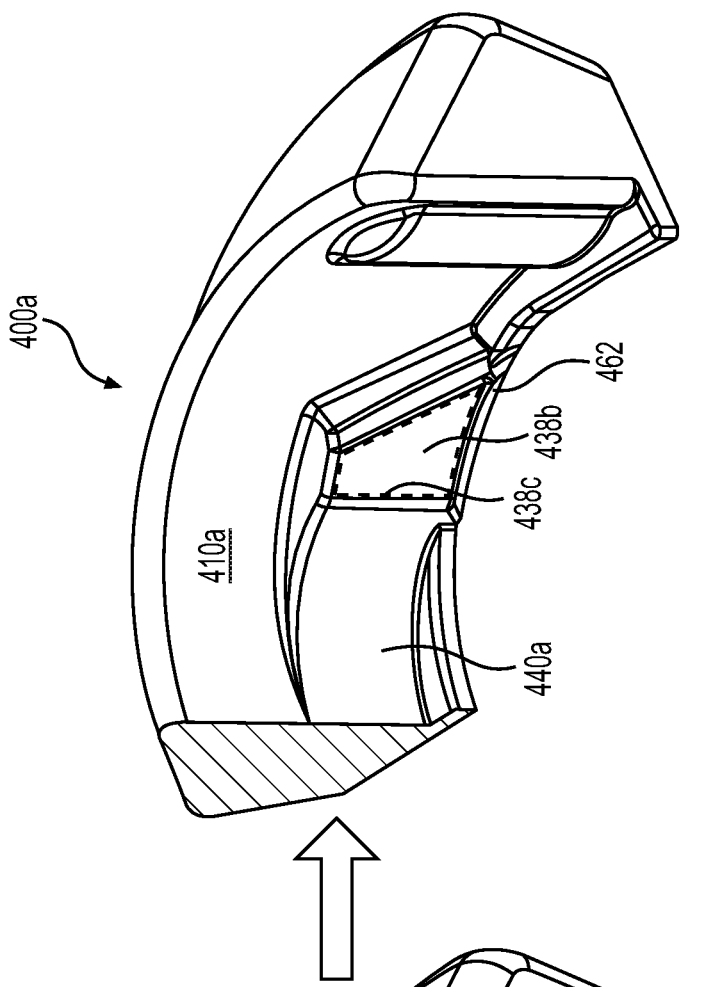
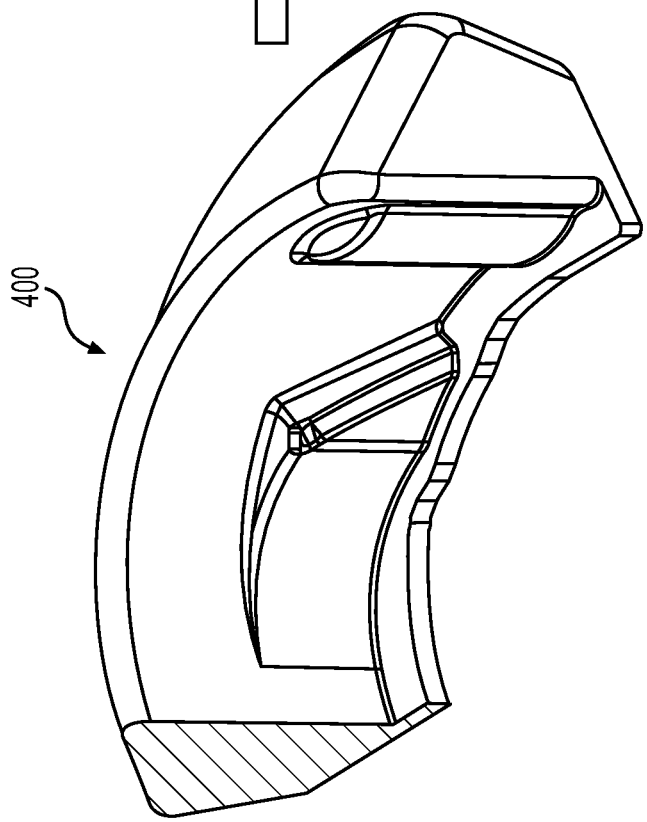
FIG. 13

RETAINER SLEEVE DESIGN WITH ANTI-ROTATION FEATURES

CROSS-REFERENCE TO RELATED APPLICATIONS

The present disclosure is a divisional of U.S. patent application Ser. No. 16/929,630, filed Jul. 15, 2020, and claims the benefit of priority under 35 U.S.C. § 119 (e) of U.S. Provisional Application Ser. No. 62/887,745 filed on Aug. 16, 2019 with the same title, the contents of which are hereby incorporated by reference in its entirety.

TECHNICAL FIELD

The present disclosure relates to retaining mechanisms employed on work implement assemblies such as bucket assemblies used by earth moving, mining, construction equipment and the like for attaching a tip to an adapter of the work implement assembly. More specifically, the present disclosure relates to a retaining mechanism that uses a retainer sleeve to hold a retainer of the retaining mechanism in a locked or unlocked configuration.

BACKGROUND

Machines such as wheel loaders, excavators, and the like employ work implement assemblies including bucket assemblies, rakes, shears, etc. that have teeth or tips attached to them to help perform work on a material such as dirt, rock, sand, etc. For example, teeth or tips may be attached to a bucket assembly to help the bucket assembly to penetrate the ground, facilitating the scooping of the dirt into a bucket, etc. Adapters are often attached to the work edges (e.g. the base edge, the side edge, etc.) of the bucket or other work implement so that different styles of teeth or tips may be attached to the work implement. Also, the tips or teeth may be replaced easily when worn by providing a retaining mechanism that is used to selectively hold the tip onto the adapter or to allow the tip be removed from the adapter.

These retaining mechanisms may include a plastic retainer sleeve that holds the retainer in the tip. The retainer sleeve may also have features that hold the retainer in a locked or unlocked position to allow replacement of the tips. The retainer sleeve operates in various conditions and operating methods. In extreme operating conditions and methods, a more robust sleeve may be required.

Accordingly, while current retainer sleeves work well in certain applications, continuous improvement is warranted to provide retainer sleeves suitable for other applications.

SUMMARY OF THE DISCLOSURE

A retainer sleeve according to an embodiment of the present disclosure may comprise a body including an at least partially annular configuration defining an axis of rotation, a radial direction, and a circumferential direction. The body may also comprise a radially inner annular surface defining a radially inner aperture; and a first anti-rotation feature extending radially inwardly from the radially inner annular surface including a sloping ledge having a locking surface that faces at least partially in the circumferential direction and along a direction that is parallel to the axis of rotation, forming an oblique angle with the direction that is parallel to the axis of rotation in a plane perpendicular to the radial direction.

A retainer sleeve according to another embodiment of the present disclosure may comprise a body including an at least partially annular configuration defining an axis of rotation, a radial direction, a circumferential direction, a first axial end disposed along the axis of rotation, and a second axial end disposed along the axis of rotation. The body may also comprise a radially inner annular surface defining a radially inner aperture, a detent feature including a rib extending radially inwardly from the radially inner annular surface, defining a rib radial height, and a lip disposed at the first axial end extending radially and circumferentially past the rib.

A retainer and retainer sleeve assembly according to an embodiment of the present disclosure may comprise a retainer including a drive portion, and a lug receiving portion defining a lug receiving slot that extends partially through the lug receiving portion, forming a first sidewall, a second sidewall, and a catch surface connecting the first sidewall to the second sidewall. The lug receiving portion may also include a skirt that at least partially defines the first sidewall, second sidewall, and catch surface. The skirt may terminate at a sloped face that intersects with the first sidewall. The assembly may also comprise a retainer sleeve including a body including an at least partially annular configuration defining an axis of rotation, a radial direction, and a circumferential direction. The body of the retainer sleeve may also include a radially inner annular surface defining a radially inner aperture, and a first anti-rotation feature extending radially inwardly from the radially inner annular surface including a sloping ledge having a locking surface is at least partially complimentarily shaped to engage the sloped face of the skirt of the retainer.

BRIEF DESCRIPTION OF THE DRAWINGS

FIG. 8 is a front view of the retainer and retainer sleeve assembly of FIG. 6 with section lines for FIG. 9.

FIG. 9 is a top sectional view of the retainer and retainer sleeve assembly of FIG. 8 taken along lines 9-9 thereof.

FIG. 10 is a front view of the retainer and retainer sleeve assembly of FIG. 6 with section lines for FIG. 11.

FIG. 11 is a bottom sectional view of the retainer and retainer sleeve assembly of FIG. 10 taken along lines 11-11 thereof.

FIG. 13 is a side by side comparison of the partially sectioned embodiments of a retainer sleeve of FIGS. 7 and 12.

DETAILED DESCRIPTION

Figure 1:
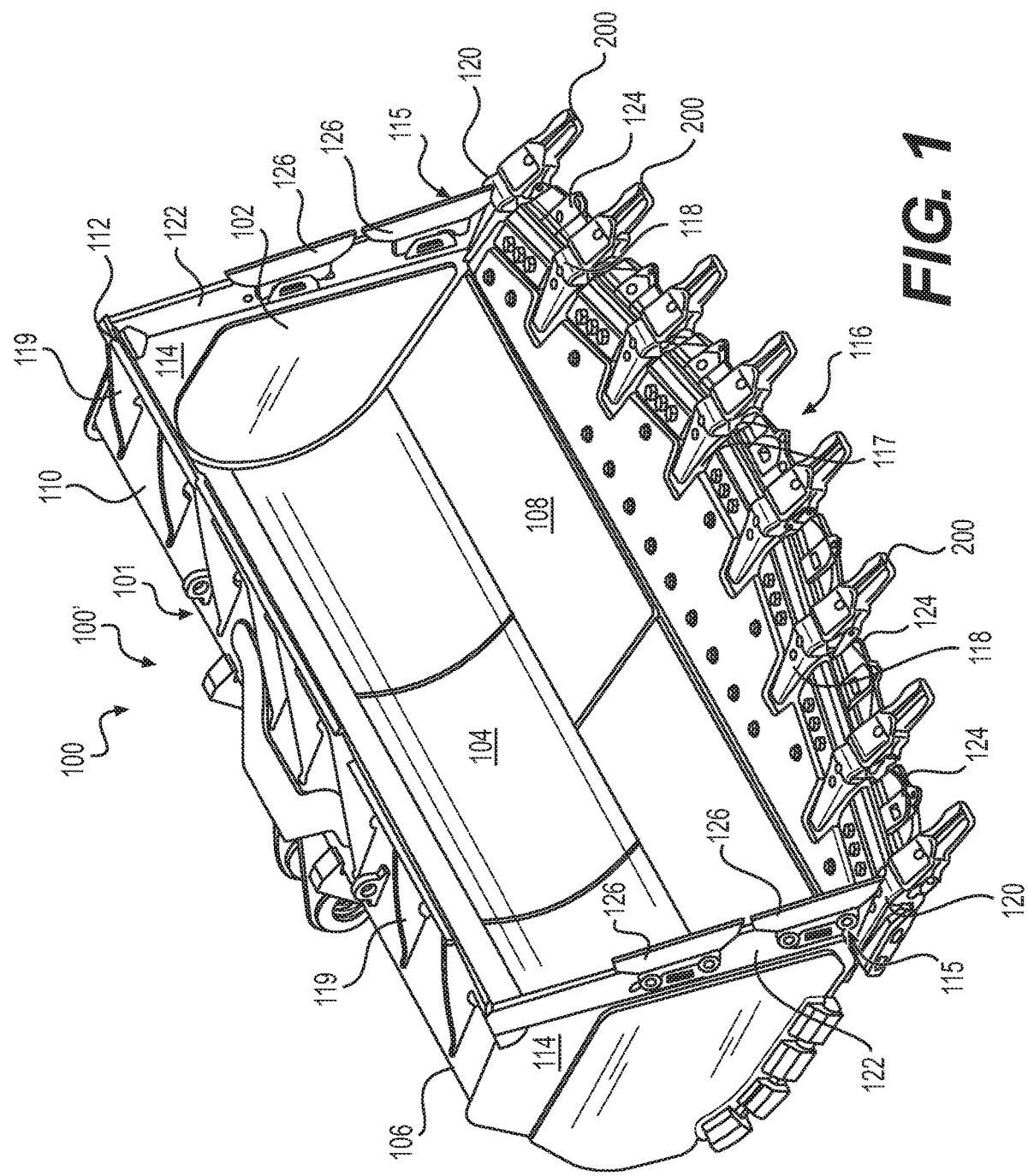
FIG. 1 is a perspective view of a work implement assembly such as a bucket assembly using tips, adapters, and retaining mechanisms with components configured according to various embodiments of the present disclosure.
Figure 2:
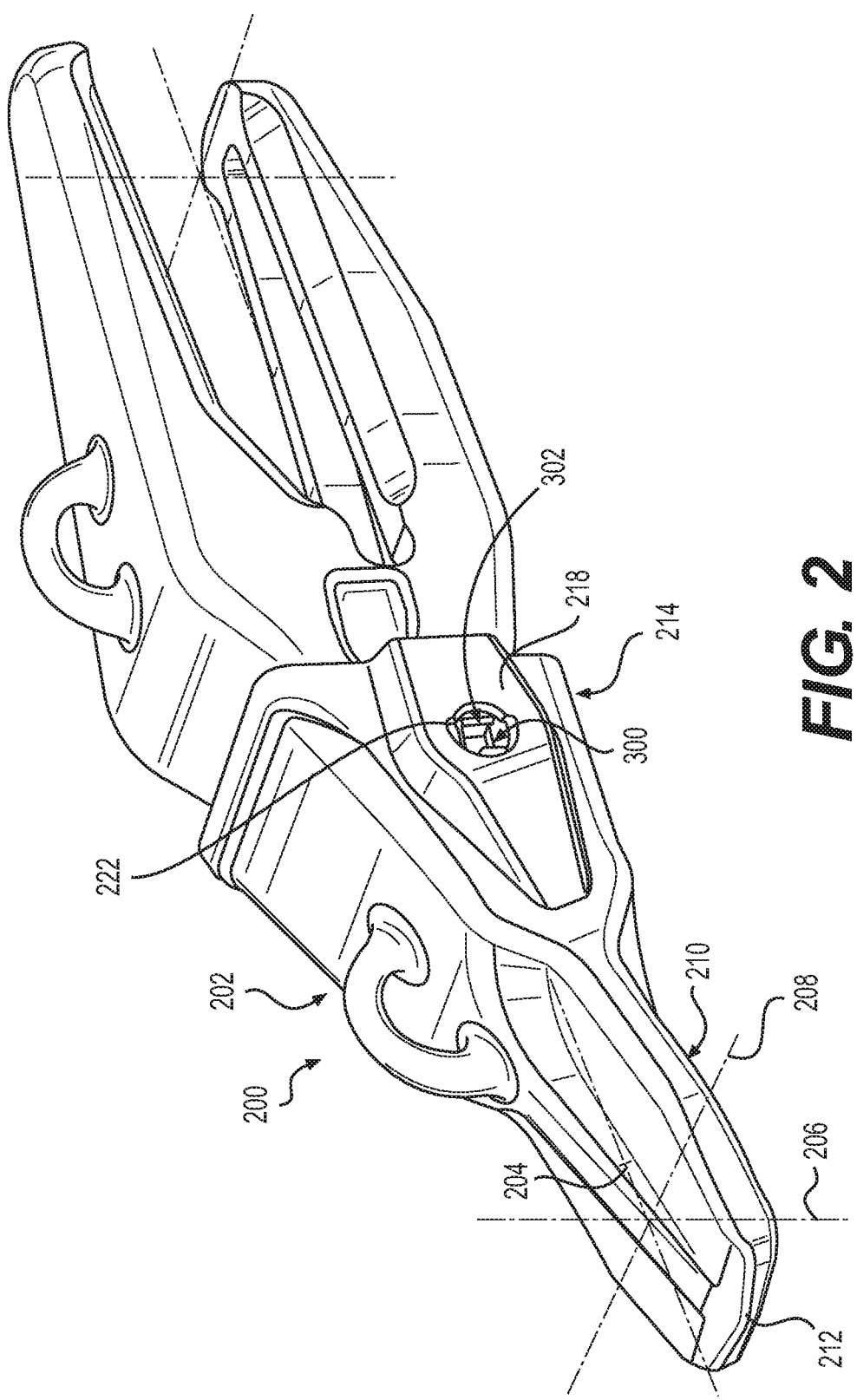
FIG. 2 is a perspective view of a tip and adapter subassembly of FIG. 1, shown in isolation from the work implement assembly of FIG. 1.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function such as is often the case when geometry is mirrored about a plane of symmetry. For ease of explanation in this specification, letters or primes will often not be included herein but may be shown in the drawings to indicate duplications of features discussed within this written specification.

A work implement assembly using tips according to various embodiments of the present disclosure will now be discussed.

Starting with FIG. 1, the work implement assembly 100 may take the form of a bucket assembly 100' that may be used by a wheel loader and that includes an enclosure 101 that defines an opening 102 that communicates with a generally enclosed interior. Starting from the rear of the bucket assembly 100 as shown in FIG. 1, the bucket assembly 100 includes a curved shell profile 104, which is attached to a rear wall 106 at the top end of the shell 104. The other end of the shell is attached to the bottom plate 108 of the assembly 100. A top plate 110 is attached to the top end of the rear wall 106. The top plate 110 transitions to a spill guard 112 that is designed to funnel material into the interior of the bucket and prevent material from spilling out of the bucket. Reinforcing ribs 119 are provided that are attached to the top plate 110 and the spill guard 112, providing reinforcement for strength. Two substantially flat end plates 114 are attached to the side edges of the spill guard 112, top plate 110, rear wall 106, bottom plate 108 and shell 104.

A side edge assembly 115 is attached to each end plate 114 while a front edge assembly 116 is attached to the front edge of the bottom plate 108 of the bucket assembly 100. The front edge assembly 116 includes a base edge 117 that is attached to the bottom plate 108, a plurality of center adapters 118 attached to the base edge 117, and a plurality of tips 200 (may also be referred to as tools, teeth, etc.) with each one of the plurality of tips 200 being attached to one of the plurality of center adapters 118. Also, two corner adapters 120 are also attached to the base edge and the side edges 122 of the bucket assembly 100'. Tip 200 may also be attached to the corner adapters 120.

Moreover, a plurality of base edge protectors 124 are also provided with each one of the base edge protectors 124 positioned between center adapters 120 and between a center adapter 120 and a corner adapter 120. A side edge protector 126 is also provided that is attached to the side edge 122 proximate to a corner adapter 120.

It is to be understood that the work implement assembly may take other forms other than a bucket assembly including rake assemblies, shear assemblies, etc. In addition, a differently configured bucket that is meant to be used by an excavator may also use various embodiments of a tip, retaining mechanism, adapter, spring, spring loaded retainer, tip assembly, and tip and adapter assembly, etc. as will be discussed herein.

In FIGS. 2 thru 5, the tip 200 may comprise a body 202 that defines a longitudinal axis 204, a vertical axis 206 that is perpendicular to the longitudinal axis 204, and a lateral axis 208 that is perpendicular to the vertical axis 206, and the longitudinal axis 204. The body 202 may include a forward working portion 210 disposed along the longitudinal axis 204 including a closed end 212, and a rear attachment portion 214 disposed along the longitudinal axis 204 including an open end 216.

The rear attachment portion 214 defines an exterior surface 218, an adapter nose receiving pocket 220 extending longitudinally from the open end 216, and a retaining mechanism receiving aperture 222 in communication with the adapter nose receiving pocket 220 and the exterior surface 218. An adapter nose lug receiving groove 224 may extend longitudinally from the open end 216 to the retaining mechanism receiving aperture 222. At least retainer sleeve receiving slot 226 may be in communication with the retaining mechanism receiving aperture 222 and the adapter nose receiving pocket 220.

Looking now at FIGS. 3 thru 6, a retainer and retainer sleeve assembly 300 according to an embodiment of the present disclosure will now be discussed. The assembly 300 may comprise a retainer 302 including a drive portion 304, and a lug receiving portion 306 defining a lug receiving slot 308 that extends partially through the lug receiving portion 306, forming a first sidewall 310, a second sidewall 312, and a catch surface 314 connecting the first sidewall 310 to the second sidewall 312. A skirt 316 at least partially defines the first sidewall 310, second sidewall 312, and catch surface 314 that terminates at a sloped face 318 that intersects with the first sidewall 310 (best seen in FIGS. 3 and 6). Another sloped face may be provided proximate to the second sidewall 312 in other embodiments of the present disclosure, but not necessarily so.

Figure 3:
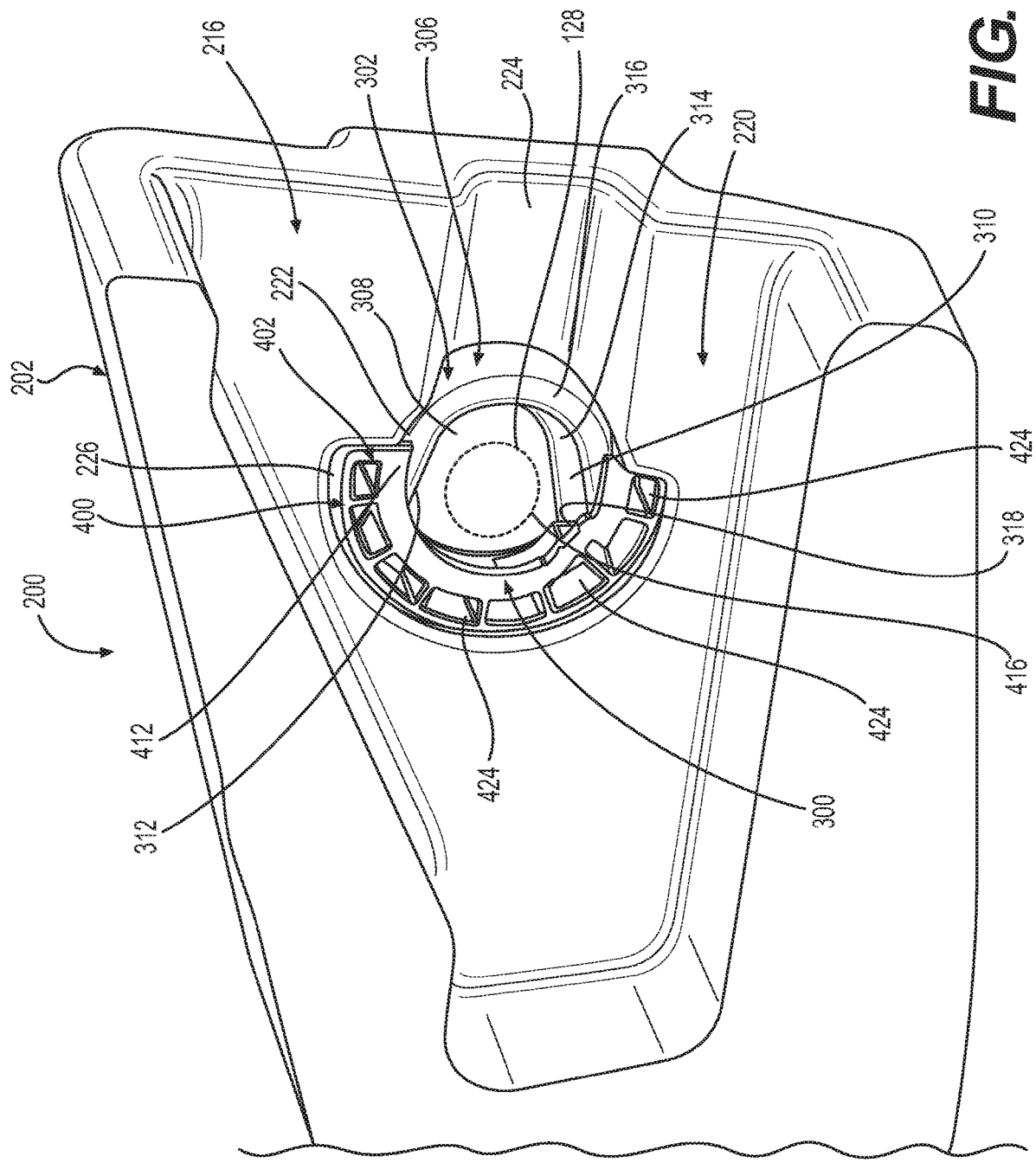
FIG. 3 is a side sectional view of the tip of FIG. 2 without the adapter, showing a retaining mechanism and its components including a retainer and a retainer sleeve with anti-rotation and retention features according to an embodiment of the present disclosure in a locked configuration.
Figure 5:
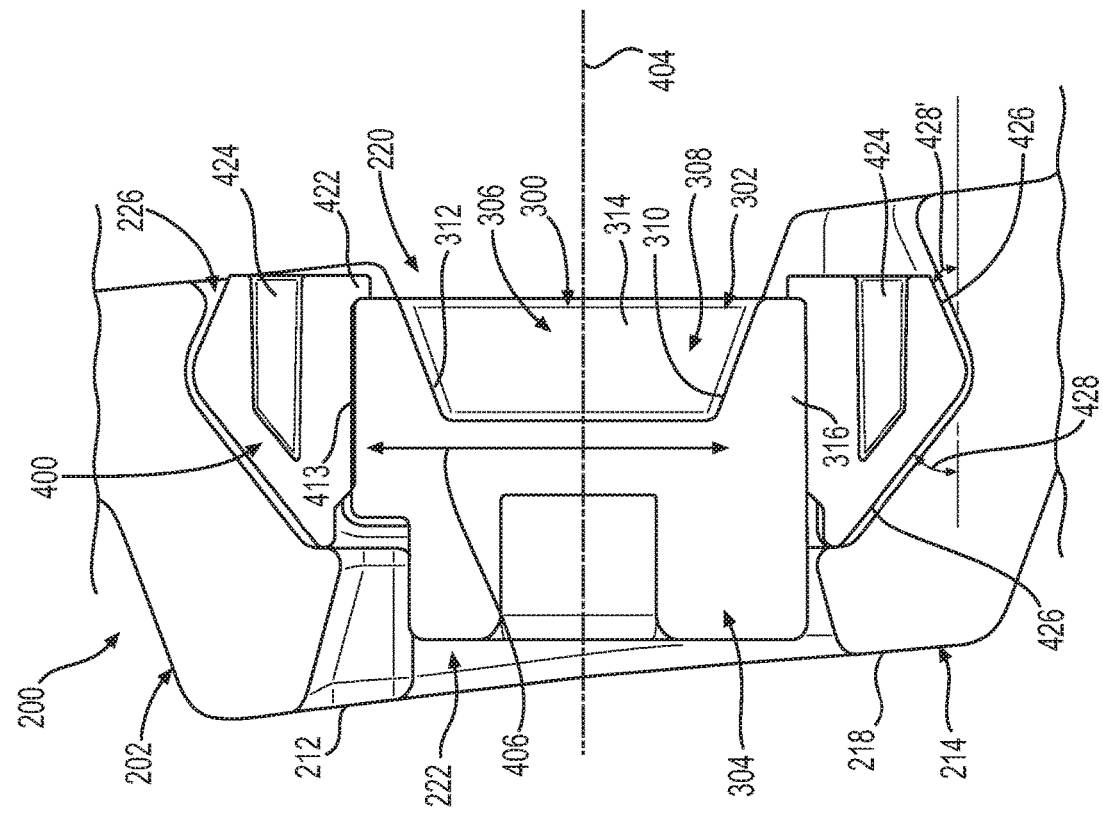
FIG. 5 is a partial rear sectional view of FIG. 2 illustrating a retaining mechanism and its components including the retainer and retainer sleeve with anti-rotation and retention features according to various embodiments of the present disclosure being assembled into the retaining mechanism receiving aperture of the tip. The retainer is shown in an unlocked configuration.
Figure 4:
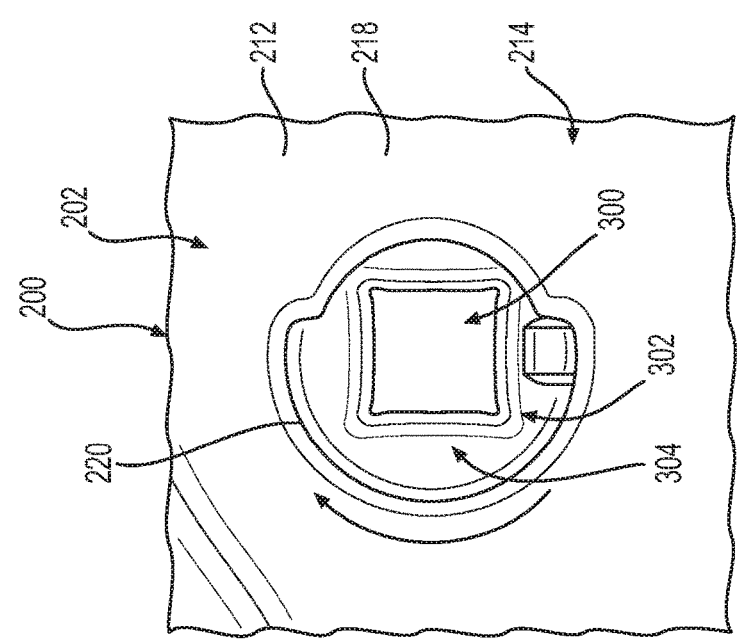
FIG. 4 is a side view of the tip of FIG. 2 showing the retainer being rotated from a locked to an unlocked configuration.

In FIG. 3, the outline of a lug 128 that is captured by the retainer and retainer sleeve assembly 300 is shown. It is to be understood that the retainer 302 is oriented as shown in FIG. 5 when the tip 200 is inserted over the nose of the adapter. The lug 128 passes first through the adapter nose lug receiving groove 224 and then into lug receiving slot 308 until is surrounded on three sides by the first sidewall 310, the second sidewall 312, and the catch surface 314. Then, the retainer 302 is rotated 180 degrees until the lug 128 is captured on all sides by the retainer 300 and the retainer sleeve 400 as shown in FIG. 3. Now, the tip is retained on the adapter. This process may be reversed to remove the tip from the adapter.

With continued reference to FIGS. 3 thru 6, a retainer sleeve 400 according to various embodiments of the present disclosure will now be discussed in the further detail. The retainer sleeve 400 may include a body 402 including an at least partially annular configuration (e.g. at least partially cylindrical, at least partially conical, etc.) defining an axis of rotation 404, a radial direction 402, and a circumferential direction 406 (best seen in FIG. 6). The axis of rotation 404 is so called for either or both of two reasons. First, at least some of the geometry of the retainer sleeve 400 (and by implication the retainer 302), may be modeled by rotating cross-sectional geometry about the axis of rotation 404. Second, the retainer 302 may be configured to be rotated about this axis of rotation 404. Other configurations are possible in other embodiments of the present disclosure.

Figure 6:
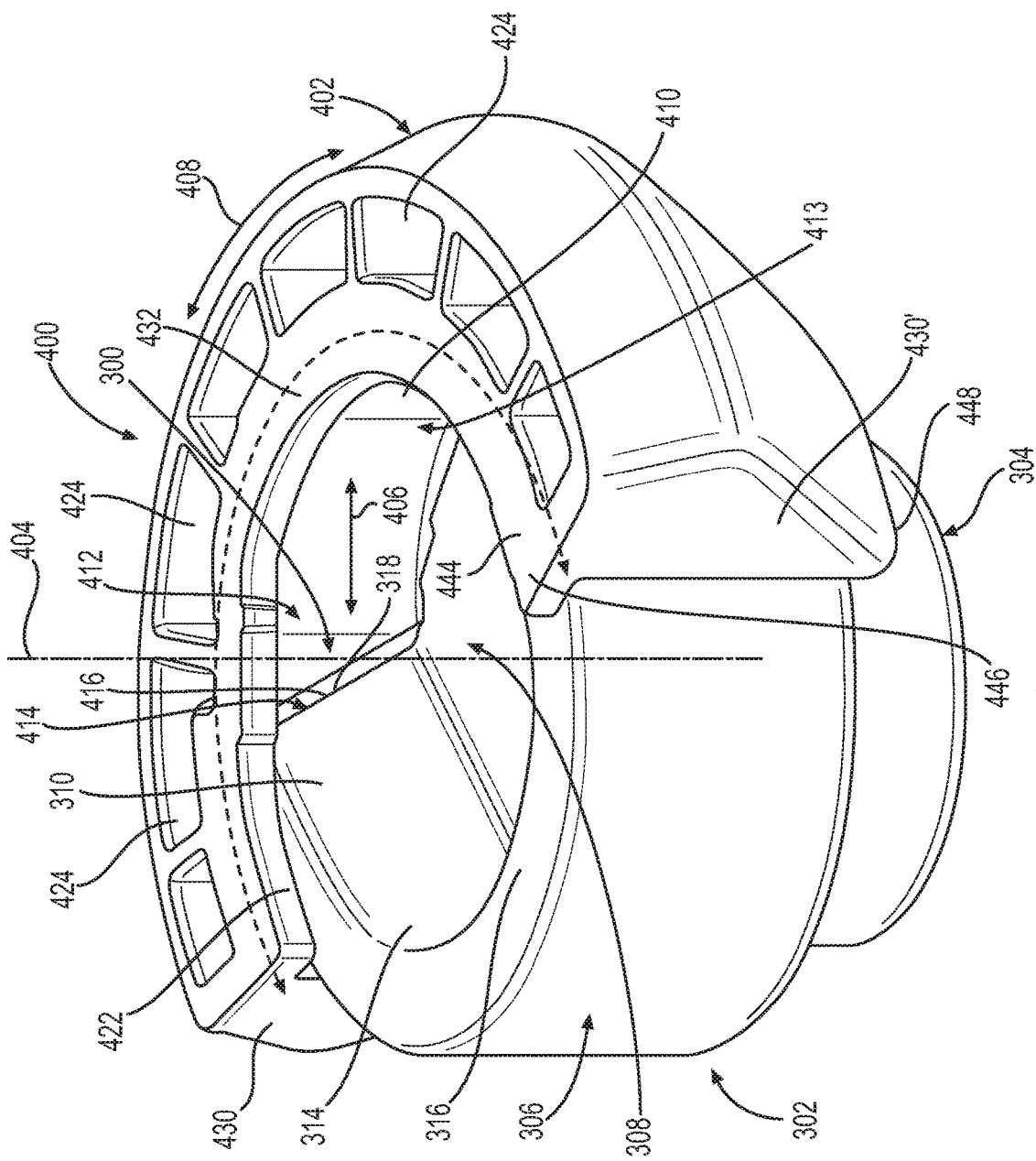
FIG. 6 is a top oriented perspective view of the retainer and retainer sleeve assembly employed in FIGS. 3 thru 5 removed from the tip for enhanced clarity.
Figure 7:
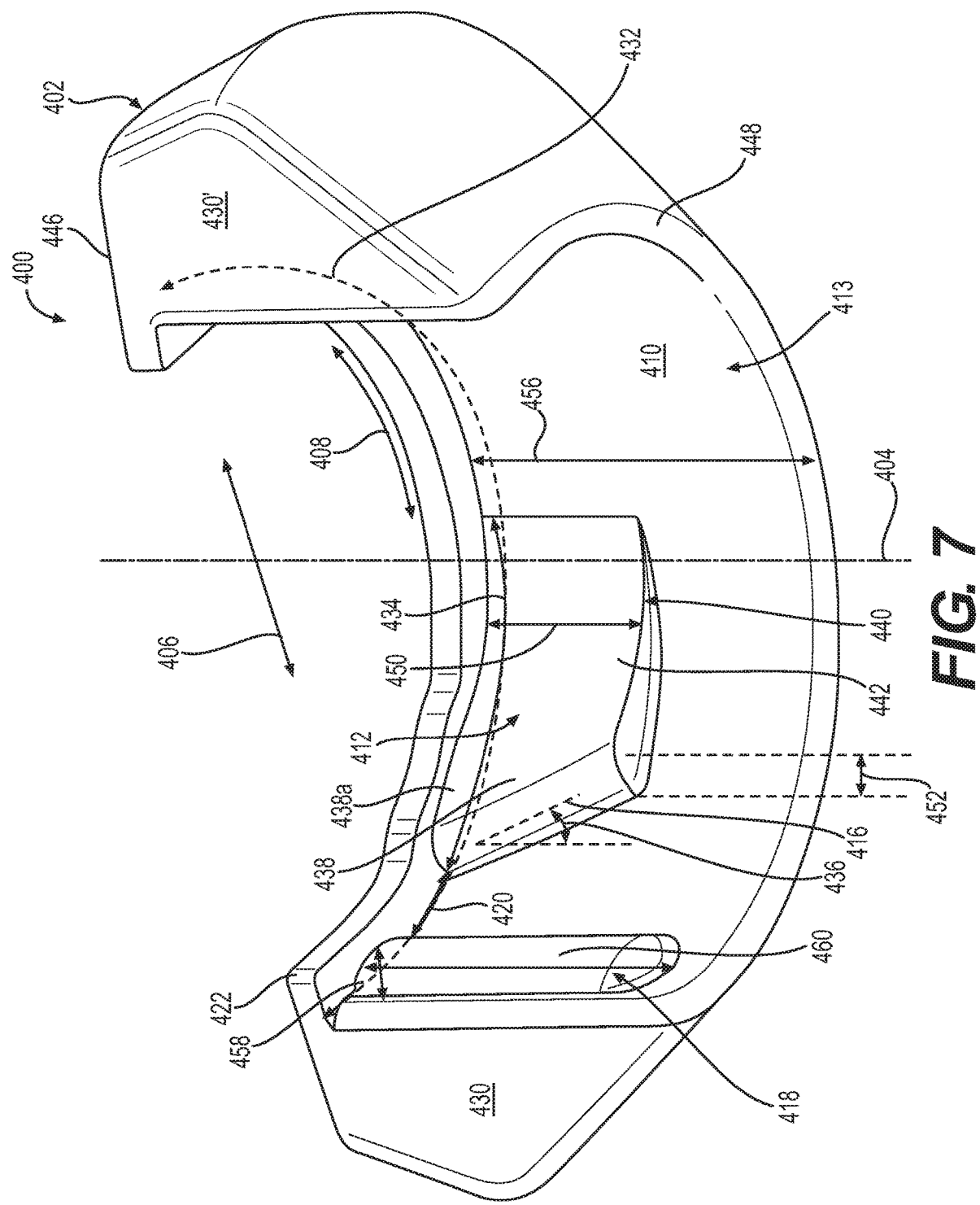
FIG. 7 is a bottom oriented perspective view of the retainer sleeve of FIG. 6 shown in isolation.

As best seen in FIGS. 6 and 7, a radially inner annular surface 410 may define a radially inner aperture 413, and may include a first anti-rotation feature 412 extending radially inwardly from the radially inner annular surface 410. The first anti-rotation feature 412 may include a sloping ledge 414 having a locking surface 416 (see also FIG. 7) is at least partially complimentarily shaped to engage the sloped face 318 of the skirt 316 of the retainer 302. This locking surface 416 may be planar, slightly arcuate, etc.

Focusing on FIG. 7, the retainer sleeve 400 may further comprise a detent feature including a rib 418 extending radially inwardly from the radially inner annular surface 410. The rib 418 may be spaced circumferentially away a predetermined distance 420 from the first anti-rotation feature 412. The predetermined distance 420 is measured as an arc length from the rib 418 to the first anti-rotation feature 412 (e.g. to the locking surface) at the intersection of the lip 422 and the radially inner annular surface 410. The rib 418 may have a cylindrical, conical, or other arcuate configuration in various embodiments. In other embodiments, it may have a pointed shape, polygonal shape, etc. in a plane parallel with the radial direction 406.

The body 402 may be formed by molding a polyurethane material (e.g. thermoplastic injection molded, cast, cured, etc.). When molded, voids 424 may be provided in the design (see FIGS. 3, 5, 6, 9, and 11) that provide a more uniform wall thickness to help prevent the formation of voids, sinks, porosity, etc. in the body 402 resulting from the manufacturing process. The material, structure, or both of the body 402 may contribute to the resiliency of the body 402 so that the body 402 may deform and rebound. This is desirable when locking and unlocking the retainer 302 and when inserting the retainer sleeve 400 into the retainer sleeve receiving slot 226 of the tip 200 (see FIG. 5).

To that end, a pair of radially outer angled surfaces 426, 426' that form different draft angles 428, 428' with a direction parallel to the axis of rotation 404 in a plane containing the radial direction 406, and the axis of rotation 404 (see FIG. 5). These draft angles 428, 428' may be tailored so that it is easier to insert the retainer sleeve 400 into the slot 226 than to remove it. This helps to hold the retainer sleeve 400 in the slot 226, which in turn, helps hold the retainer 302 in the tip 200.

In FIGS. 6 and 7, the retainer sleeve 400 defines a first circumferential end 430 disposed along the circumferential direction 408, a second circumferential end 430' disposed along the circumferential direction 408. The rib 418 may be disposed proximate to the first circumferential end 430. A second rib 418' may be disposed proximate the second circumferential end 430' but not necessarily so (see FIGS. 9 and 11). The second rib 418' may be similarly, identically, or dissimilarly configured as the other rib 418 in various embodiments of the present disclosure. It should also be noted that only one anti-rotation feature is shown that is proximate to the first circumferential end, but is contemplated that another anti-rotation feature may be provided near the second circumferential end that is similarly, identically, or dissimilarly configured as the first anti-rotation feature in other embodiments of the present disclosure.

Still referring to FIGS. 6 and 7, the lip 422 extends radially and circumferentially past the rib 418, and the first anti-rotation feature 412, entirely overhanging the rib 418 and the first anti-rotation feature 412. This may not be the case in other embodiments of the present disclosure.

More particularly, the lip 422 extends from the first circumferential end 430 to the second circumferential end 430', defining an lip arc length 432 measured from the first circumferential end 430 to the second circumferential end 430' at the intersection of the radially inner annular surface 410 and the lip 422.

In certain embodiments a ratio of the lip arc length 432 to the predetermined distance 420 may range from 12.0 to 16.0, and the predetermined distance 420 may range from 3.0 mm to 9.0 mm.

Likewise, the first anti-rotation feature 412 may define a maximum circumferential dimension 434 measured as an arc length at the intersection of the radially inner annular surface 410, and the lip 422. A ratio of the lip arc length 432 to the maximum circumferential dimension 434 may range from 3.5 to 4.5, and the maximum circumferential dimension may range from 15.0 mm to 45.0 mm.

Any of these ranges of ratios or dimensions may be different than what has been specifically mentioned in other embodiments of the present disclosure.

Next, a retainer sleeve 400 according to various embodiments of the present disclosure that may be supplied as a replacement part will be discussed.

Looking at FIG. 7, the retainer sleeve may have a body 402 including an at least partially annular configuration (as previously described herein) defining an axis of rotation 404, a radial direction 406, and a circumferential direction 408. A radially inner annular surface 410 may defining a radially inner aperture 413. The first anti-rotation feature 412 may extend radially inwardly from the radially inner annular surface 410 including a sloping ledge 414 having a locking surface 416 that faces at least partially in the circumferential direction 408 and along a direction that is parallel to the axis of rotation 404, forming an oblique angle 436 with the direction that is parallel to the axis of rotation 404 in a plane perpendicular to the radial direction 406.

In certain embodiments, the oblique angle 436 may range from 50 degrees to 80 degrees and may at least partially match the angle of the sloped face 318 of the retainer 302 (see FIG. 6) as alluded to earlier herein. Also, the body 402 may comprise at least one of the following: a plastic, a rubber, an elastomer, a mesh structure (e.g. has voids), and a foam. This may help to make the body 402 resilient so that it can deform and rebound during the assembly, the locking, and the unlocking processes as discussed earlier herein.

With continued reference to FIG. 7, the first anti-rotation feature 412 may further include a cam surface 438 (may also be referred to as a first transitional surface) extending radially inwardly and circumferentially from the locking surface 416. A ramp 440 may also be provided that extends circumferentially from the cam surface 438 to the radially inner annular surface 412. As a result of the configuration of the locking surface 416, the cam surface 438, and the ramp 440, the cam surface 438 may have a triangular shape (e.g. a triangular perimeter 438a), and the ramp 440 may include an arcuate surface 442. Other configurations of these features are possible in other embodiments of the present disclosure. A discussion of the functions of these various features of the first anti-rotation feature 412 will be discussed later herein.

Looking at FIGS. 6 and 7, the at least partially annular configuration of the body 402 defines an angular extent 444 about the axis of rotation 404, a first axial end 446 that is disposed along the axis of rotation 404, and a second axial end 448 that is disposed along the axis of rotation 404. The body 402 may have a lip 422 that is disposed at the first axial end 446 extending along the entirety of the angular extent 444. This may not be the case in other embodiments of the present disclosure.

As alluded to earlier herein, the lip 422 may extend radially past the first anti-rotation feature 412. Also, the first anti-rotation feature 412 may extend axially away from the lip 422 toward the second axial end 448 defining a maximum axial dimension 450 of the first anti-rotation feature 412. Similarly, the first anti-rotation feature 412 also defines a maximum radial dimension 452 measured radially from the radially inner annular surface 410 to the radial extremity of the first anti-rotation feature 412. Moreover, the radially inner aperture 413 may define an inner diameter 454 (see FIG. 11), and a radially inner aperture axial depth 456 (see FIG. 7) measured axially from the lip 422 to the second axial end 448.

In certain embodiments, a ratio of the radially inner aperture axial depth 456 of the radially inner aperture 413 to the maximum axial dimension 450 of the first anti-rotation feature 412 may range from 1.5 to 2.5, and a ratio of the inner diameter 454 of the radially inner aperture 413 to the maximum radial dimension 452 of the first anti-rotation feature may range from 10.0 to 15.0. In such embodiments, the maximum axial dimension 450 may range from 7.0 mm to 16.0 mm, and the maximum radial dimension 452 may range from 2.0 mm to 5.0 mm.

Another retainer sleeve 400 according to another embodiment of the present disclosure may be described as follows with reference to FIG. 7.

The retainer sleeve 400 may include a body 402 including an at least partially annular configuration defining an axis of rotation 404, a radial direction 406, a circumferential direction 408, a first axial end disposed 446 along the axis of rotation 404, and a second axial end 448 disposed along the axis of rotation 404.

A radially inner annular surface 412 may define a radially inner aperture 413, a detent feature including a rib 418 extending radially inwardly from the radially inner annular surface 412. The rib 418 may define a rib radial height 458 (see also FIG. 9), and a lip 422 disposed at the first axial end 446 extending radially and circumferential past the rib 418. The rib 418 may extend axially from the lip 422 toward the second axial end 448, defining a rib axial length 460. Also, the radially inner annular surface 410 may define an inner diameter 454' (see FIG. 11), and a radially inner aperture axial depth 456 as mentioned just above herein.

In certain embodiments, a ratio of the radially inner aperture axial depth 456 to the rib axial length 460 may range from 1.5 to 1.0, and a ratio of the inner diameter 454' to the rib radial height 458 may range from 22.0 to 30.0. In such embodiments, the rib axial length 460 may range from 15.0 mm to 32.0 mm, and the rib radial height 458 may range from 1.0 mm to 3.0 mm.

Again, the body 402 may comprise at least one of the following: a plastic, a rubber, an elastomer, a mesh structure (e.g. a honeycomb like structure), and a foam, making the body 402 a resilient body.

Again, it should be noted that any of the ranges of ratios, dimensions, angles, surface areas and/or configurations of various features may be varied as desired or needed including those not specifically mentioned herein. Although not specifically discussed, blends such as fillets are shown to connect the various surfaces. These may be omitted in other embodiments and it is to be understood that their presence may be ignored sometimes when reading the present specification unless otherwise specifically mentioned.

INDUSTRIAL APPLICABILITY

In practice, a machine, a work implement assembly, a tip assembly, a tip and adapter assembly, a retainer sleeve, a retainer and retainer sleeve assembly and/or any combination of these various assemblies and components may be manufactured, bought, or sold to retrofit a machine or a work implement assembly in the field in an aftermarket context, or alternatively, may be manufactured, bought, sold or otherwise obtained in an OEM (original equipment manufacturer) context.

Any of the aforementioned components may be made from any suitable material including iron, grey-cast iron, steel, plastic, rubber, foam, etc.

The features of the retainer sleeve and retainer as previously described herein may operate as follows to facilitate a robust locked configuration and a less robust unlocked configuration.

First, (best understood with reference to FIG. 5) the retainer 302 and the retainer sleeve 400 are snapped into the retainer sleeve receiving slot 226, and the retaining mechanism receiving aperture 222. The construction of the retainer sleeve 400 is such that it is resilient enough to deform locally and/or as a whole so that it can be snapped into the retainer sleeve receiving slot 226 and rigid enough to remain therein. The lip 422 of the retainer sleeve 400 holds the retainer 302 axially in place. The lip 422 extends completely around the perimeter of the retainer sleeve 400 to provide robust axial retention of the retainer 302 in the retaining mechanism receiving aperture 222.

As can be appreciated by FIGS. 3, 6, 7, 9 and 11, the rib 418 of the detent feature provides a slight retaining force to hold the retainer 302 in the locked and/or unlocked position. This slight retaining force may be easily overcome by inserting a tool into the drive portion 304 of the retainer 302. The first anti-rotation feature 412 provides a more robust retaining force than the detent feature. Hence, one skilled in the art might refer to the first anti-rotation feature 412 as a primary device for preventing rotation of the retainer 302 while the detent feature might be referred to as a secondary device for preventing rotation of the retainer 302 from the locked to unlocked configuration.

As best understood with reference to FIG. 7, the first anti-rotation feature 412 includes a ramp 440 with a greater circumferential extent than that the cam surface 438, and the locking surface 416. Accordingly, the force required to rotate the retainer 302 from the unlocked configuration to the locked configuration is less than what is required to unlock the retainer 302.

More specifically, the wedge or cam effect provided by ramp 440 as it contacts the skirt 316 of the retainer 302 spreads apart the retainer sleeve 400 into the clearance (part of 226) found between the tip 202 and the retainer sleeve 400 (as well as providing local deformation) more easily than when the process is reversed to achieve an unlocked configuration.

When the retainer 302 is rotated from the locked position to the unlocked position, the oblique angle 436 of the locking surface 416 provides less of a wedge or cam effect to spread the retainer sleeve 400 open. If enough force is exerted, the skirt 316 of the retainer 302 eventually contacts the cam surface 438, which primarily deflects the first anti-rotation feature 412 radially outwardly into a void 424. The retainer 302 may then be more easily rotated to achieve the unlocked configuration. Hence, the likelihood of the undesired rotation of the retainer 302 from the locked to unlocked configuration is lessened.

Turning now to FIGS. 12 thru 15, another embodiment of a retainer sleeve 400a that may be easier to assemble, and ease the rotating of the lock/retainer from the locked configuration to the unlocked configuration, while increasing the amount of torque necessary to lock.

It is to be understood that the retainer sleeve 400a and retainer and retainer sleeve assembly 300a is similarly or identically constructed and operated as the embodiments shown in FIGS. 1 thru 11 except as contradicted or otherwise described as follows.

Figure 12:
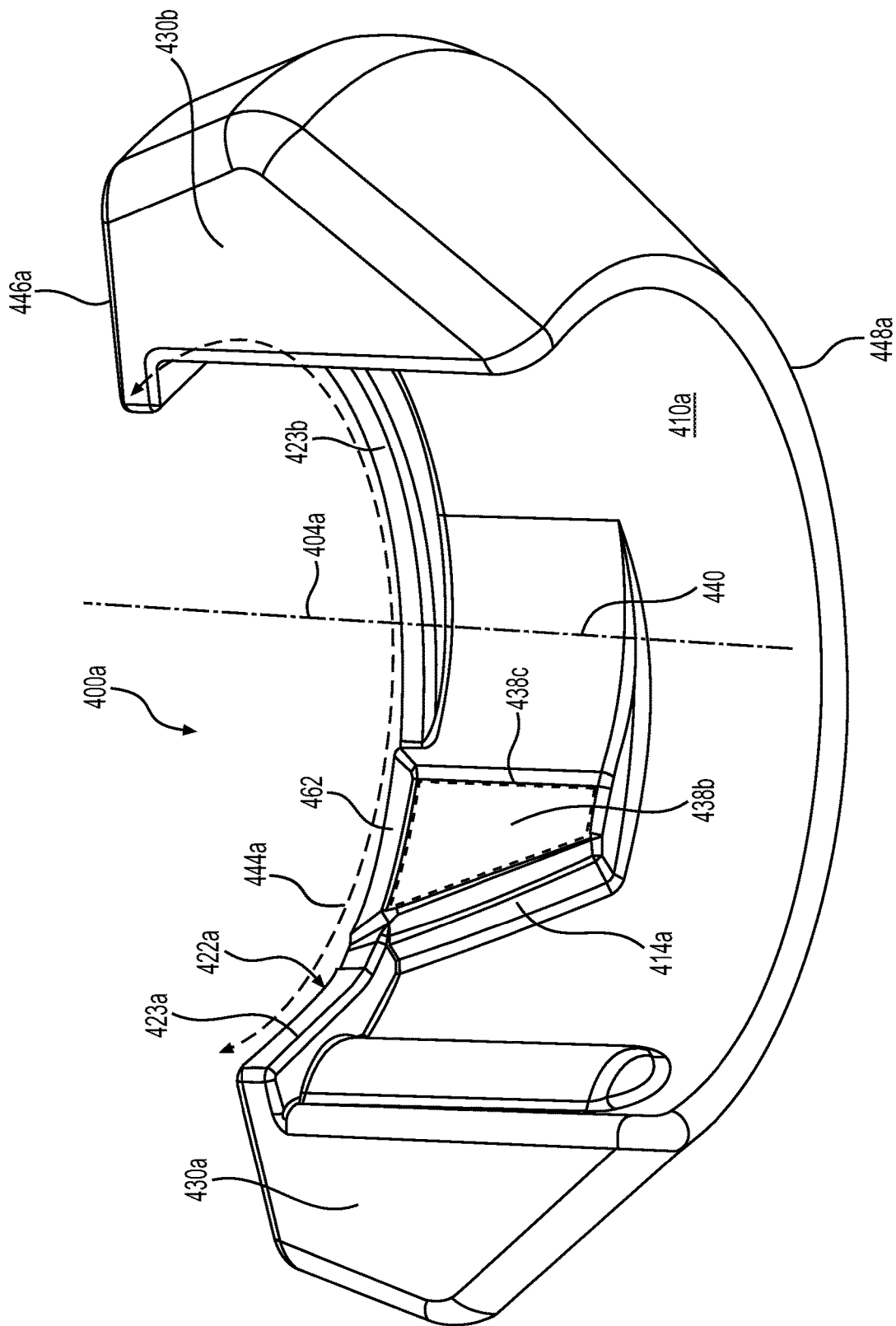
FIG. 12 is a bottom oriented perspective view of another embodiment of a retainer sleeve similar to that of FIG. 7 shown in isolation.
Figure 15:
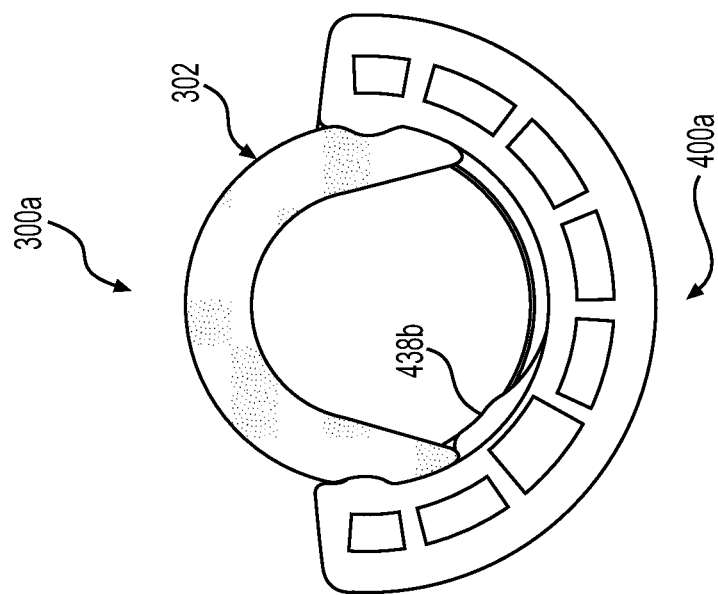
FIG. 15 illustrates the more gradual cam action provided by the increased arcuate cam surface of FIG. 12 when employed in a retainer and retainer sleeve assembly.
Figure 14:
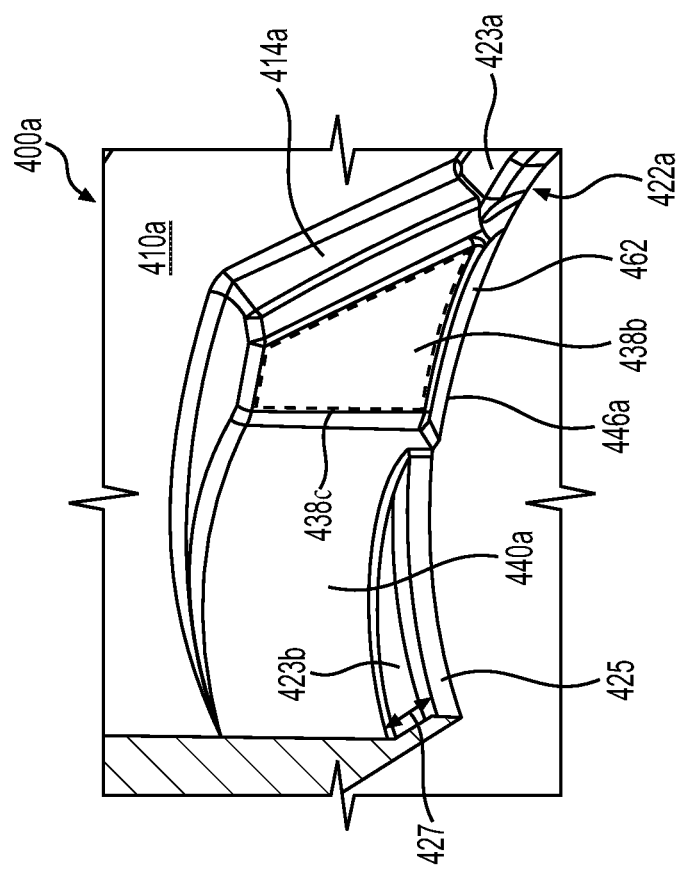
FIG. 14 is an enlarged perspective view of the changed areas of the retainer sleeve of FIG. 12 as compared to the embodiment of FIG. 7.

In FIGS. 12 thru 14, it can be appreciated that the cam surface 438b may be increased circumferentially by several millimeters such that its triangular shape in FIG. 7 becomes a quadrilateral shape (see quadrilateral perimeter 438c) in FIGS. 12 thru 14. As a result, the ramp 440a has a shorter circumferential extent with an arcuate shape having a smaller radius of curvature. The result is that surface area of contact between the retainer and retainer in FIG. 9 is increased to what is shown in FIG. 15 (at 438b).

Focusing on FIG. 12, the retainer sleeve 400a may include a first circumferential end 430a, a second circumferential end 430b, and an angular extent 444a from the first circumferential end 430a to the second circumferential end 430b about the axis of rotation 404a. Furthermore, a first axial end 446a, and a second axial end 448a may be disposed along the axis of rotation 404a. A lip may be disposed at the first axial end extending along the entirety of the angular extent (see FIG. 7), or a split lip 422a may be provided as shown in FIG. 12. This split lip 422a may include a first lip portion 423a that extends circumferentially from the first circumferential end 430a to the sloping ledge 414a, and a second lip portion 423b extending circumferentially from the second circumferential end 430b to the ramp 440a.

Turning to FIG. 14, the split lip 422a may define a free end 425, and a lip overhang dimension 427 measured radially from the radially inner annular surface 410a to the free end 425 of the split lip 422a that ranges from 1.0 mm to 4.0 mm. This dimension may be one or more millimeters less than the maximum radial dimension 452 in FIG. 7 in some embodiments.

Also, the first lip portion 423a of the split lip 422a may be separated from the second lip portion 423b of the split lip 422a by a lead-in surface 462 (e.g a conical surface as shown, an arcuate surface, etc.) that is non-parallel with the axis of rotation 404a, and that extends from the cam surface 438b to the first axial end 446a. This surface 462 may aid in inserting the retainer into the retainer sleeve. This feature may be omitted in other embodiments of the present disclosure.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A retainer and retainer sleeve assembly comprising:
    a retainer including
        a drive portion, and
        a lug receiving portion defining a lug receiving slot that extends partially through the lug receiving portion, forming a first sidewall, a second sidewall, and a catch surface connecting the first sidewall to the second sidewall, and including a skirt that at least partially defines the first sidewall, second sidewall, and catch surface, the skirt terminating at a sloped face that intersects with the first sidewall; and
    a retainer sleeve including
        a body including
        an at least partially annular configuration defining an axis of rotation, a radial direction, and a circumferential direction;
        a radially inner annular surface defining a radially inner aperture; and
        a first anti-rotation feature extending radially inwardly from the radially inner annular surface including a sloping ledge having a locking surface is at least partially complementarily shaped to engage the sloped face of the skirt of the retainer.

2. The retainer and retainer sleeve assembly of claim 1 wherein the retainer sleeve further comprises a lip intersecting the radially inner annular surface, and a detent feature including a rib extending radially inwardly from the radially inner annular surface, the rib being spaced circumferentially away a predetermined distance from the first anti-rotation feature, the predetermined distance being measured as an arc length from the rib to the first anti-rotation feature at the intersection of the lip and the radially inner annular surface.

3. The retainer and retainer sleeve assembly of claim 2 wherein the retainer sleeve defines a first circumferential end disposed along the circumferential direction, a second circumferential end disposed along the circumferential direction, and the rib is disposed proximate to the first circumferential end.

4. The retainer and retainer sleeve assembly of claim 3 wherein the lip that extends radially and circumferentially past the rib and the first anti-rotation feature, entirely overhanging the rib and the first anti-rotation feature.

5. The retainer and retainer sleeve assembly of claim 4 wherein the lip extends from the first circumferential end to the second circumferential end, defining an lip arc length measured from the first circumferential end to the second circumferential end at the intersection of the radially inner annular surface and the lip.

6. The retainer and retainer sleeve assembly of claim 5 wherein a ratio of the lip arc length to the predetermined distance ranges from 12.0 to 16.0.

7. The retainer and retainer sleeve assembly of claim 6 wherein the predetermined distance ranges from 3.0 mm to 9.0 mm.

8. The retainer and retainer sleeve assembly of claim 5 wherein the anti-rotation feature defines a maximum circumferential dimension measured as an arc length at the intersection of the radially inner annular surface and the lip, and a ratio of the lip arc length to the maximum circumferential dimension ranges from 3.5 to 4.5.

9. The retainer and retainer sleeve assembly of claim 8 wherein the maximum circumferential dimension ranges from 15.0 mm to 45.0 mm.

10. The retainer and retainer sleeve assembly of claim 1 wherein the body is formed by molding a polyurethane material, and the body also includes a pair of radially outer angled surfaces that form different draft angles with a direction parallel to the axis of rotation in a plane containing the radial direction and the axis of rotation.

11. A retainer and retainer sleeve assembly comprising:
a retainer including
a drive portion, and
a lug receiving portion defining a lug receiving slot that extends partially through the lug receiving portion, and including a skirt forming a catch surface connecting a first sidewall to a second sidewall, and the skirt terminating at a sloped face; and
a retainer sleeve including a body having an at least partially annular configuration defining an axis of rotation, a radially inner annular surface defining a radially inner aperture, and an anti-rotation feature extending radially inwardly from the radially inner annular surface and at least partially complementarily shaped to the sloped face.

12. The retainer and retainer sleeve assembly of claim 11 wherein the anti-rotation feature includes a sloping ledge having a locking surface positioned to engage the sloped face at an angular orientation about the axis of rotation.

13. The retainer and retainer sleeve assembly of claim 12 wherein the anti-rotation feature includes a cam surface extending in a circumferential direction from the locking surface, and a ramp surface extending in the circumferential direction from the cam surface.

14. The retainer and retainer sleeve assembly of claim 13 wherein the ramp surface extends from the cam surface to the radially inner annular surface.

15. The retainer and retainer sleeve assembly of claim 13 wherein the locking surface faces at least partially in the circumferential direction and along a direction that is parallel to the axis of rotation forming an oblique angle with the direction that is parallel to the axis of rotation in a plane perpendicular to a radial direction.

16. The retainer and retainer sleeve assembly of claim 13 further comprising a detent extending radially inward from the radially inner annular surface and spaced in a circumferential direction from the anti-rotation feature.

17. The retainer and retainer sleeve assembly of claim 16 wherein the detent includes a rib extending in an axial direction, and the rib and the locking surface together defining an angle opening in the axial direction.

18. The retainer and retainer sleeve assembly of claim 12 wherein the retainer sleeve further comprises a lip intersecting the radially inner annular surface.

19. The retainer and retainer sleeve assembly of claim 18 further comprising a detent, and the lip has a circumferential extent encompassing the detent and the anti-rotation feature.

\* \* \* \* \*